Dec. 12, 1933.   N. FREDRIKSEN   1,939,045
COMPOSITION TILE AND METHOD OF MAKING THE SAME
Filed April 30, 1932
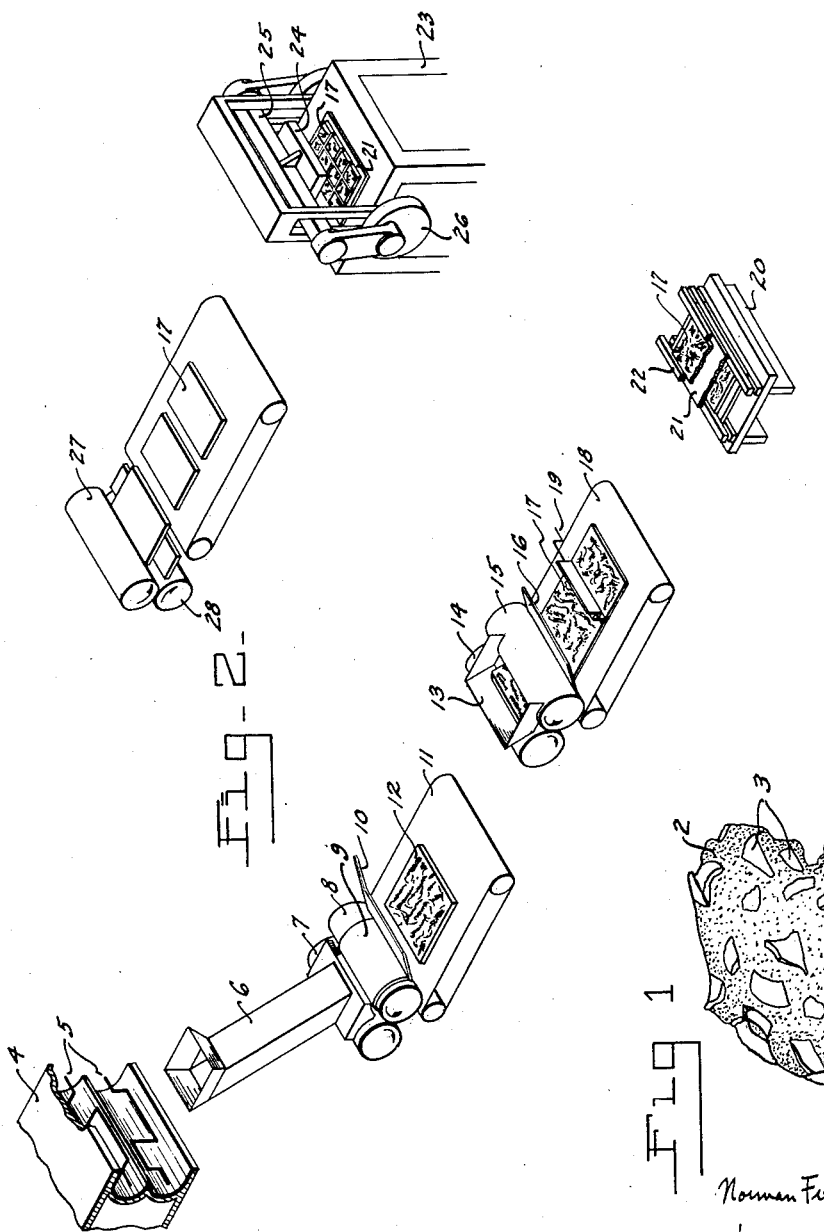

Patented Dec. 12, 1933

1,939,045

UNITED STATES PATENT OFFICE 1,939,045

COMPOSITION TILE AND METHOD OF MAKING THE SAME

Norman Fredriksen, Lancaster, Pa., assignor to Armstrong Cork Company, Lancaster, Pa., a corporation of Pennsylvania Application April 30, 1932. Serial No. 608,360

14 Claims. (Cl. 18—48.8)

This invention relates to composition tiles and method of making the same and more especially to the production of a striated or marbleized effect.

Composition tiles of the so-called asphalt or mastic type consist of a suitable filler or fillers held together by a binder or cement. The usual fillers are asbestos, color pigments and various mineral fillers. The most commonly used binder consists of a mixture of pitch, gilsonite and resin.

In the manufacture of material of this type, the fillers and pigments are mixed with a binder. The commonly used binders are of a hard, friable nature, and are usually broken into pieces convenient for handling. The mixture is placed in any suitable mixer provided with heating and agitating means and the binder by reason of its thermoplastic character is reduced to a plastic state. The pigments and fillers are thoroughly coated and a tough, dough-like mass is produced. The mass is then formed by calendering to produce the desired final product. In the production of tile elements, the sheets are preferably dried into the desired size and configuration while the calendered sheets are still relatively warm and plastic. The tiles upon cooling become hard and brittle due to the hard, "horny" nature of the binder. There is considerable breakage due to handling and shipping and it is not unusual for a manufacturer to have a 20% loss in shipment due to cracked and broken tiles.

A new composition suitable for the production of mastic tiles has been recently developed. This new composition is fully described in the co-pending application of Claxton & Bare, filed June 20, 1932 and bearing Serial No. 618,300. The composition consists essentially of a flexibleized binder and filler. The binder is produced by mixing a suitable quantity of flexibleizing material, such for example as a gelled siccative oil, with a resin such as cumar. This binder when mixed with suitable fillers and pigments and sheeted produces a hard, alkali resistant material which is considerably more flexible than the materials heretofore produced.

I prefer to use this type of binder in the production of my tile composition but it will be understood that other binders may be wholly or partially substituted therefor as is well understood in tile manufacture.

Attempts have been heretofore made to produce a marbleized effect by mixing portions of variously colored plastic tile composition together in the usual heated mixing machines. In order to get an interspersion of the variegating colors, mixing is necessary. The binder being of a thermoplastic nature tends to blend the colors one into the other and a relatively uniform color mixture is produced. The colors tend to smear; the darker color almost obliterating the lighter colors. The material produced upon calendering is of a cloudy, smeary nature and has no hard sharp lines of demarcation which are so characteristic of natural marble.

I have found that graining closely approaching the appearance of natural marble and having hard, sharp, clear lines of demarcation between the base color and the variegating color or colors can be readily produced if certain limitations, such as temperature of mixes, proportions of variegating color, etc. are carefully observed.

In order that my invention may be more readily understood, I will describe a specific embodiment thereof as applied to the production of a two-color marbleized tile, having a base of black and a variegating constituent of white, using a flexibleized binder as above described. It will be understood, however, that other types of binders, color pigments and fillers may be substituted for those herein recited; it being my intention to recite a specific example of a composition which will give the desired results as a matter of illustration and not of limitation.

*The base composition*

The base composition is preferably formed by thoroughly mixing together a suitable binder, pigments and fillers. I prefer to use a flexibleized binder as above described. The material may be incorporated in the following proportions in order to produce a black base composition; all proportions being given in parts by weights:

|  | Parts |
|---|---|
| Resin | 75 |
| Flexibleizing cement | 35 |
| Carbon black | 8 |
| Long fibered asbestos | 30 |
| Short fibered asbestos | 200 |
| Linoleum scrap | 55 |

The resin I prefer to use is cumar having a melting point of about 135° C. This resin is relatively cheap and is readily available and permits the production of light-colored as well as dark colored compositions due to its light color. The flexibleizing cement is preferably a gelled drying or semi-drying oil or a mixture of drying and semi-drying oils. This cement is of a tenacious, stiff and somewhat thermoplastic nature. I have found that a mixture of 68 parts by weight of menhaden or fish oil and 7 parts by weight of linseed oil when oxidized with 25 parts by weight of rosin produces a satisfactory gel for my purpose. The carbon black produces the desired color. The long fibered asbestos is used to strengthen the material and give it greater resistance to cleavage. The short fibered asbestos is used as a filler. In the above example 55 parts by weight of comminuted scrap linoleum composition has been added as a filler. If desired this material may be eliminated by increasing the amount of asbestos or other filler, and the amount of flexibleizing cement.

The resin and cement are mixed in an open type mixer. I prefer to use a mixer of the well known Werner-Pfleiderer type. This mixer is provided with a shell type kettle which is heated by the use of steam and with two mixing blades which revolve in opposite directions. One blade travels slightly faster than the other in order to aid in thorough mixing. The blades are cored out and are provided with steam connections. The pigments and fillers are added preferably after the cement and resin have been intermixed although all the constituents may be placed in the mixer at one time. The heat is raised until a temperature somewhere between 250° and 300° F. is obtained. This heat is maintained and mixing is continued until a homogeneous, tough, dough-like mass is obtained. This usually requires 15 to 20 minutes for a batch weighing about 400 pounds. The heat melts down the thermoplastic binder which thoroughly coats the pigment and filler particles and unites the mass. The mixing is then interrupted, but the heating is continued. The variegating constituents are next added as will be more fully hereinafter described.

The variegating composition

The variegating composition is preferably of the same character as the base composition but of a different shade, tint or color which may be termed broadly "different color value". The variegating composition may, however, vary widely from the base composition if desired. A white variegating material suitable for use with the above base composition may be produced by mixing the following constituents; all of the proportions are given in parts by weight:

|  | Parts |
| --- | --- |
| Resin | 80 |
| Flexibleizing cement | 40 |
| Titanium oxide | 50 |
| Whiting | 75 |
| Long fibered asbestos | 40 |
| Short fibered asbestos | 130 |

After thorough mixing, similar to that described above in the production of the base composition, the hot, plastic mass is fed to a pair of milling or sheeting rolls and sheets preferably about ⅛" thick are produced. The sheets are substantially the width of the milling rolls and are cut to a length convenient for handling. These sheets are placed in suitable racks and permitted to cool and harden. The sheets after hardening are placed in a suitable breaking machine. I have found that a machine provided with a cylindrical shell and having therein a revolving shaft provided with steel blades spaced helically about 2" from each other is satisfactory for this purpose. Any machine which is operable to produce pieces ranging in size from fine particles about the size of a match head up to about one inch across in flat section will be suitable. After breaking I prefer to screen out the fine particles and also those pieces which are larger than about ½" across in flat section. The fines are removed by passing the material over a sieve having about eight meshes to the inch. Those pieces which do not pass through the screen are then passed over a screen having two meshes to the inch. Those pieces which do not pass through the latter screen are placed in the breaking machine when the next batch of variegating sheets are fed thereto. The resulting mass comprising pieces ranging in size from ½" across in flat section by ⅛" thick to pieces ⅛" across by ⅛" thick, are flat and of irregular contour, but are of substantially uniform thickness.

I have described the preferred procedure for producing the variegating pieces. It is possible to produce the variegating colors by other methods however. For example, I may produce the white variegating color of the above example by thoroughly mixing the constituents in a heated mixer, discharging the material into any suitable container, permit cooling and hardening and thereafter breaking the lumpy mass into small pieces. If the tile composition is a good one, it is somewhat difficult to break up these lumps, so I prefer to first sheet the material as described above prior to breaking.

I have described the production of sheets approximately ⅛" thick. It is obvious that sheets of other thicknesses will produce satisfactory results. It is quite possible to calender these sheets to $\frac{1}{16}$", or even as thick as ¼" to ½". I have found that ⅛" sheets produce a desirable type of graining.

Mixing of base and variegating constituents

The variegating material in the embodiment described will preferably equal about one-twentieth of the total weight of the base color. This variegating material is added progressively to avoid undue smearing. When the base composition has been thoroughly mixed, the mixer is stopped and opened and about one quarter of the total amount of variegating material desired to be incorporated into the mass is sprinkled as flat, chip-like pieces over the mass of hot base material. The blades of the mixing machine are then given about one-half revolution and stopped. A second quarter of the variegating material is then sprinkled over the base mass and the blades given another one-half turn. This procedure is repeated until all of the variegating material has been incorporated into the base. The variegating color is preferably kept at room temperature before incorporation into the hot base matrix. If there is any tendency toward smearing, the variegating colors may be cooled by refrigeration or other suitable means prior to introduction into the base.

It is important that the mixing be limited to that required for thorough distribution or smearing will result. In the above example it will be noted that the mixing blades have made but two complete revolutions. If the amount of added variegating material is greater in proportion to the base than the above example, more revolutions are given the mixing blades in order to get sufficient distribution. The variegating color should be added as rapidly as possible for the heat of the base mix soon renders the variegating material plastic and any mixing after the variegating material has become plastic will result in smearing and continued mixing will result in complete obliteration of variegation and production of a substantially uniform color. A relatively cool, variegating color facilitates breakage and prevents too rapid softening of the material upon incorporation into the base material.

After the variegating color has been incorporated, the mass is allowed to remain in the heated mixer until the variegating pieces or chips have been rendered sufficiently plastic to permit calendering or milling. In the example given above about four or five minutes elapse between the time of incorporation of the variegating color and discharge from the mixer. This time, of course, is dependent upon the amount and character of variegating pieces and their temperature when incorporated into the base mix.

In the above example the variegating color is in the proportion of 20 to 1. It will be apparent to those skilled in the art that other proportions may be used depending upon the strength of colors and type of graining desired. It is also possible to use two or more variegating colors. For example, I may provide a base of dark green and use light green and white pieces as the variegating material. The proportions may vary within a wide range, and I have produced variegated materials in which the variegating colors were equal in weight to the "base" composition.

Forming striated sheets

The intermixed material may be formed into striated sheets in any suitable manner. I will describe a specific method of producing striated sheets with reference to the accompanying drawing which illustrates the preferred embodiment of the invention and certain modifications thereof.

Figure I is a view showing a mass of base color with variegating material incorporated therein.

Figure II is a diagrammatic view illustrating various apparatus arranged in a preferred sequence and adapted to carry out my invention.

The material shown in Figure I is a lump of plastic base material 2 having pieces of variegating color 3 distributed through it. It will be noted that these pieces 3 are of irregular contour, but are substantially flat. The mass of dough-like material is discharged from the mixing machine which is indicated generally at 4 (Figure II). This machine is diagrammatically shown in discharge position. During the mixing operation the discharge opening is upward. The mixing blades are indicated at 5. The lumps of base matrix with intermixed variegating color are discharged from the mixing machine into the chute 6 which conveys the material to a suitable milling or calendering mechanism. The material is relatively hot and plastic; the temperature of the mass being somewhere between 240° and 260° F. The calendering or milling mechanism consists essentially of a pair of rolls 7 and 8 which are driven by a suitable power source not shown. These rolls rotate in opposite directions as indicated by the arrows; the face roll 8 rotating at a higher speed than the roll 7. A speed ratio of about 4 : 3 has been found satisfactory. The back roll 7 is heated with steam or other suitable means to a temperature ranging between 250° and 300° F. The face roll 8 is heated to about 180° to 220° F. The plastic material adheres to the face roll 8 and forms a relatively uniform layer 9 therearound. The material 9 is permitted to revolve with the roll 8 until substantially all of the blisters are pressed out. This usually requires four or five complete revolutions of the face roll. The material which rests against the face of the roll 8 is not smeared or milled to any great extent, whereas the outer surface is milled by the action of the back roll 7. It is desirable to discontinue milling immediately after the blisters are removed. After sufficient milling, the material 9 is stripped from the roll 8 by engagement of the doctor blade 10. The removed sheet is picked up by the conveyor 11 and is carried forward thereon. This sheet is indicated at 12. It will be noted that it has striations which run in a direction substantially parallel with the direction of the conveyor. It will also be noted that the material which was in contact with the face of the roll 8 now forms the face of the sheet 12. The sheet 12 is preferably of greater thickness than the desired thickness of the final product. For example in the production of a finished tile $\frac{3}{16}$" thick, the sheet produced by the sheeting operation may be .400" thick.

The sheet 12 is taken from the conveyor and is placed in the hopper 13 and fed into the calender rolls 14 and 15. The sheet is preferably fed into the nip of the rolls at right angles to the direction of the striations, that is, the sheet 12 as it rests on the conveyor is turned through a 90° angle before being placed into the nip of the rolls of the finishing calender. The calender rolls 14 and 15 are preferably driven at about the same speed and are set to produce a sheet substantially the desired final thickness. The roll 15 is preferably warmer than the roll 14. I have found that if the face roll is maintained at about 120° F. and the back roll at about 60° F. desirable results will be obtained. The sheet has a tendency to adhere to the roll 15. A doctor blade 16 is continuously forced into contact with the roll 15 so as to strip the sheet 17 therefrom. In the facing operation, there is no milling of the material around the face roll as in the sheeting operation. The second calendering reduces the sheet to the desired thickness and tends to pull out the parallel striations producing an effect closely simulating the appearance of natural marble and at the same time producing a smoother surface. The rolls on the finishing calender are maintained at a lower temperature than the sheeting rolls in order to prevent smearing and to produce a better face. The sheet 17 which is stripped from the roll by the doctor is severed into desired lengths by the revolving cutter 19. The sheets are then placed upon a skid truck or other suitable support 20; each sheet resting on a suitable plate 21 and spaced from each other by spacing blocks 22. The marbleized sheets are permitted to cool to about 140° F. before being cut to the desired configuration.

I have indicated a suitable dieing apparatus as 23 which is provided with a reciprocating cutting die 24 carried on a bar 25. The bar 25 is reciprocated by the crank mechanism 26.

While I have described the preferred procedure for producing striated sheets, it will be apparent to those skilled in the art that the material may be otherwise manipulated to produce desired effects. For example, it is quite possible to use the sheet 12 as the final product without further rolling although the type of graining will not so closely simulate the appearance of natural marble as does the sheet made by the process hereinbefore described. I have found that desirable effects can be produced by passing the sheet 12 through the finishing calender in a direction parallel to the direction of the striations. It is also quite possible to make a pack of the sheets 12 prior to introduction into the finishing calender. The direction of the graining of the various sheets which form the pack may be either parallel to the direction of rolling or at right angles thereto. A very desirable type of graining can be produced by folding the sheet 12 longitudinally, with the face side out, and then feeding this folded sheet at right angles to the direction of the striation through the finishing calender. When folded or packed sheets are used, it is desirable to reduce the thickness of the sheet 12. For example, when using a pack consisting of two sheets or a single folded sheet, the thickness of the sheet 12 may be about .200".

If it is desired to produce a high gloss effect, such as would be desirable on wall tiles, the sheets are allowed to remain on the plates 21 until they have cooled to about 90° F. and at which time they are relatively hard. These sheets are then fed into a suitable calender. The rolls of this calender should be set to reduce the sheets only a very small amount, say .005" to .010". If a greater reduction is attempted, the hard sheets tend to break, due to their brittle character. I have indicated diagrammatically a pair of calender rolls 27 and 28 which are preferably driven at about equal speeds. The face roll is maintained at about 70° F. and the backing roll at about 120° F.

It has been found that this calendering operation produces a high gloss surface on the sheets. This is probably due to the fact that the sheets are relatively hard and permit building up a very high pressure on the face of the sheet. This pressure produces a smoothing or ironing effect which is not disturbed by any marked tendency of the face to pull off by adherence to the calender roll. The material is too cool and is not sufficiently plastic to induce or permit sticking to the roll. If a matte or dull feathery effect is desired the rolling should be effected while the material is more warm and plastic. The sheets after being acted upon are heated to about 140° F. before dieing into the desired configuration.

I have described my invention with particular reference to the production of flat tile-like elements. My invention may be practiced in the production of other articles, however. As an illustration, I may mould plastic sheets into cove and base elements as is well understood in this art. I may also produce wainscot edgings and similar moulded or formed elements from my striated sheets.

I have disclosed the use of a flexibleized binder comprising a gelled mixture of menhaden and linseed oils with a suitable quantity of rosin. I may, however, substitute any gelled siccative oil cement having similar characteristics or I may use the usual pitch-gilsonite binder or other suitable binding agent. I may substitute rosin, Manila or Congo gum, Damar or other fossil gum or synthetic resin for the cumar herein recited. As a substitute for a portion or all of the asbestos, I may use a fibrous material such as wood flour.

While I have described certain specific preferred embodiments of my invention, it will be understood that the invention is not limited to the specific examples but may be otherwise embodied and practiced within the scope of the following claims.

I claim:

1. In the method of making variegated thermoplastic composition articles, the steps consisting in preparing a thermoplastic base composition in a relatively warm, plastic condition, adding thereto pieces of thermosplastic variegating composition in a condition relatively cooler and less plastic than the base composition, effecting distribution of said variegating pieces throughout the base composition substantially in their original form, maintaining the mass at sufficiently high temperature to render the variegating material plastic and interspersing the compositions by pressure.

2. In the method of making variegated thermoplastic composition articles, the steps consisting in preparing a thermoplastic base composition in a relatively warm and plastic condition, adding thereto pieces of thermoplastic variegating composition in a condition relatively cooler and less plastic than the base composition, effecting distribution of said variegating pieces throughout the base composition substantially in their original form unsmeared, maintaining the mass at sufficiently high temperature to warm the variegating composition and render the same substantially as plastic as the base composition, and milling the mass to intersperse the compositions and produce a variegated mass.

3. In the method of making variegated thermoplastic compositions, the steps consisting in introducing into a thermoplastic base composition relatively flat chip-like pieces of thermoplastic variegating composition and distributing said pieces of variegating composition throughout the base composition substantially in their original form unsmeared.

4. In the method of making variegated thermoplastic composition articles, the steps consisting in preparing a relatively warm thermoplastic composition, preparing pieces of relatively cooler and less plastic thermoplastic variegating composition, mixing the base composition and pieces of variegating compositions to distribute the variegating composition therethrough before the pieces of variegating composition absorb sufficient heat from the base composition to become plastic enough to lose their identity, and striating the mass of base composition and pieces of variegating composition by pressure.

5. In the method of making variegated sheets of thermoplastic compositions, the steps consisting in preparing a thermoplastic base composition in a condition of readily workable plasticity, preparing pieces of thermoplastic variegating composition in a relatively hard, less plastic condition, intermingling the variegating composition with the base composition and effecting distribution of the pieces throughout the base composition sufficiently quickly to avoid the pieces of variegating composition becoming sufficiently warm and plastic to smear materially or lose their identity before intermingling is accomplished, milling the mass of base composition and distributed pieces of variegating composition, and rolling to sheet form.

6. In the method of making marbleized composition tiles, the steps consisting in distributing relatively hard flat chip-like variegating thermoplastic composition pieces through a thermoplastic base composition which is relatively warmer and softer than the variegating composition while substantially preserving the identity of said variegating pieces, allowing the mass to rest substantially undisturbed until the heat of the base composition renders the variegating composition pieces substantially the same plasticity as the base composition and calendering a sheet from the mixed composition.

7. In the method of making variegated thermoplastic composition articles, the steps consisting in preparing a relatively warm plastic base composition, preparing a variegating composition in chip-like pieces having width and breadth greater than their thickness, whereby relatively large surfaces compared to their volume are provided for the transmission of heat thereto, distributing said pieces of variegating composition while relatively cold and non-plastic throughout the relatively warm plastic base composition while substantially preserving the identity of said variegating pieces, substantially equalizing the temperature throughout to render the mass substantially uniform in plasticity and striating the composition by pressure and forming the articles.

8. In the method of making variegated thermoplastic compositions, the steps consisting in preparing a warm plastic base composition, adding thereto relatively thin flat pieces of variegating thermoplastic composition in a condition relatively cooler and less plastic than the base composition, the pieces of variegating composition being of substantially uniform thickness and of varying sizes, whereby the length of time required for the warm base composition to heat through the pieces of variegating composition is substantially uniform for all sizes of variegating pieces, and effecting distribution of the pieces throughout the base composition while substantially preserving the identity of the said variegating pieces.

9. In the method of making thermoplastic composition articles, the steps consisting in hot calendering a thermoplastic composition to form a sheet, and calendering the formed sheet against a face roll which is cooler than the sheet, the temperature of the sheet being sufficiently high that the sheet is plastic to the extent that it does not crack and sufficiently low that an ironing pressure is built up resulting in a sheen on the face of the sheet.

10. In the method of making variegated thermoplastic composition articles, the steps consisting in distributing pieces of variegating material throughout a base composition without substantial smearing of the variegating pieces, calendering the mass against a face roll cooler than the mass to produce a streaked effect, cutting the sheet so produced, calendering in a direction substantially at right angles to the direction of the graining in the sheet to produce a variegated effect, cooling the sheets to render them less plastic, calendering the cooled sheets against a cooler facing roll to produce a high gloss, heating the sheets and dieing.

11. In the method of making variegated thermoplastic composition articles, the steps consisting in distributing pieces of thermoplastic variegating composition throughout a thermoplastic base composition to be variegated substantially in their original form unsmeared.

12. As a new article of manufacture, a thermoplastic mass adapted for variagation by heat and pressure, said mass having distributed throughout pieces of variegating composition of substantially the same plasticity as the body of the mass, said variegating pieces being in substantially unsmeared condition.

13. As a new article of manufacture, a variegating composition article comprising a thermoplastic base and thermoplastic variegating portions, said variegating portions being of substantially the same plasticity as the base composition but of different color value, said article being characterized by pieces of variegating composition of substantially unsmeared configuration and pieces of variegating composition of substantially unsmeared body but having their edge portions blended with the base composition.

14. As a new article of manufacture, a thermoplastic mass adapted for variegation by heat and pressure, said mass having distributed therethrough pieces of variegating composition having width and breadth greater than their thickness and of substantially the same plasticity as the body of the mass, said variegating pieces being in substantially unsmeared condition.

NORMAN FREDRIKSEN.

CERTIFICATE OF CORRECTION.

Patent No. 1,939,045.  December 12, 1933.

NORMAN FREDRIKSEN.

It is hereby certified that error appears in the printed specification of the above numbered patent requiring correction as follows: Page 1, line 23, for "dried" read died; and line 92, for "weights" read weight; page 5, line 37, claim 9, for "calerdering" read calendering; and line 89, claim 11, for "steps" read step; and that the said Letters Patent should be read with these corrections therein that the same may conform to the record of the case in the Patent Office.

Signed and sealed this 16th day of January, A. D. 1934.

F. M. Hopkins
Acting Commissioner of Patents.

(Seal)